(12) United States Patent
Von Keitz

(10) Patent No.: US 9,416,902 B2
(45) Date of Patent: Aug. 16, 2016

(54) COUPLING FOR CONNECTING FLUID-CONDUCTING LINES

(71) Applicant: Andreas Von Keitz, Diez (DE)

(72) Inventor: Andreas Von Keitz, Diez (DE)

( * ) Notice: Subject to any disclaimer, the term of this patent is extended or adjusted under 35 U.S.C. 154(b) by 0 days.

(21) Appl. No.: 14/493,767

(22) PCT Filed: Mar. 20, 2013

(86) PCT No.: PCT/EP2013/055801
§ 371 (c)(1),
(2) Date: Sep. 23, 2014

(87) PCT Pub. No.: WO2013/139847
PCT Pub. Date: Sep. 26, 2013

(65) Prior Publication Data
US 2015/0167882 A1  Jun. 18, 2015

(30) Foreign Application Priority Data

Mar. 23, 2012 (DE) .......................... 10 2012 102 509
Apr. 10, 2012 (DE) .......................... 10 2012 103 061

(51) Int. Cl.
*F16L 37/36* (2006.01)
*B67D 7/32* (2010.01)
(Continued)

(52) U.S. Cl.
CPC .............. *F16L 37/36* (2013.01); *B67D 7/3218* (2013.01); *F16K 17/36* (2013.01); *F16L 37/08* (2013.01);
(Continued)

(58) Field of Classification Search
CPC ........... F16L 37/36; F16L 37/30; F16L 37/08; F16L 55/1015; F16L 55/1022; F16L 55/1007; B67D 7/3218
USPC ....................................... 137/614.03–614, 6
See application file for complete search history.

(56) References Cited

U.S. PATENT DOCUMENTS

| 3,606,244 A | 9/1971 | Nusbaum |
| 4,896,688 A | 1/1990 | Richards et al. |

(Continued)

FOREIGN PATENT DOCUMENTS

| CN | 1254807 A | 5/2000 |
| CN | 201964071 U | 9/2011 |

(Continued)

OTHER PUBLICATIONS

International Search Report dated Jun. 5, 2013 for corresponding PCT/EP2013/055801 with English translation, 8 pages.
(Continued)

*Primary Examiner* — Kevin Lee
(74) *Attorney, Agent, or Firm* — Ohlandt, Greeley, Ruggiero & Perle, LLP

(57) ABSTRACT

The invention relates, in general, to couplings for the connection of lines, such as, in particular, flexible lines, to one another or for the coupling of flexible lines to fittings. For this purpose, a quick-action coupling (1) for coupling together fluid-conducting lines is described, which comprises a first coupling part (3) and a second coupling part (5), as well as a seal (7) for sealing the two coupling parts (3, 5) and a locking mechanism (9) in order to couple together the two coupling parts (3, 5) in a releasable manner. The two coupling parts (3, 5) are equipped with valve arrangements (11, 13). Each of the two valves (11, 13)* comprises an axially displaceable valve (15, 17), with the valve (15) of the first valve arrangement (11) having an opening (150), in which a plunger (152) is mounted so as to move axially. In the state in which the coupling parts (3, 5) are coupled together, the plunger (152) keeps the two valves (15, 17) apart from each other. The plunger (152) can be locked by means of a catch device (110). The locking mechanism (9) is operatively connected to the catch device (110), so that, when the locking mechanism (9) is actuated for decoupling the two coupling parts (3, 5) that are coupled to each other, before disconnection of the coupling parts, the catch of the plunger (152) is released and the two valves (15, 17) are brought together with the respective valve seat (19, 21).

11 Claims, 5 Drawing Sheets

(51) Int. Cl.
*F16K 17/36* (2006.01)
*F16L 55/10* (2006.01)
*F16L 37/08* (2006.01)
*B63B 27/24* (2006.01)

(52) U.S. Cl.
CPC ......... *F16L 55/1007* (2013.01); *F16L 55/1015* (2013.01); *F16L 55/1022* (2013.01); *B63B 27/24* (2013.01); *Y10T 137/0447* (2015.04); *Y10T 137/87949* (2015.04)

(56) References Cited

U.S. PATENT DOCUMENTS

| 5,615,706 | A | 4/1997 | Guertin | |
|---|---|---|---|---|
| 6,722,405 | B2 * | 4/2004 | Cessac | F16K 17/20 137/614.04 |
| 8,186,393 | B2 * | 5/2012 | Huegerich | F04B 49/065 137/614.03 |

FOREIGN PATENT DOCUMENTS

| CN | 102207233 A | 10/2011 |
|---|---|---|
| CN | 102213352 A | 10/2011 |
| DE | 3621951 A1 | 1/1988 |
| DE | 4430132 C1 | 9/1995 |
| DE | 29911281 U1 | 9/1999 |
| DE | 102005006088 A1 | 8/2006 |
| EP | 0517127 B1 | 3/1999 |
| FR | 2652403 A1 | 3/1991 |
| GB | 2128701 A | 5/1984 |
| JP | 201225468 | 2/2012 |
| WO | 2006084447 A1 | 8/2006 |

OTHER PUBLICATIONS

German Office Action dated May 30, 2014 for corresponding German Application No. 10 2012 103 061.8 with English translation, 9 pages.
Written Opinion of the International Searching Authority dated Jun. 5, 2013 for corresponding PCT/EP2013/055801 with English translation, 14 pages.
International Preliminary Report on Patentability dated Sep. 23, 2014 for corresponding PCT/EP2013/055801 with English translation, 16 pages.
English translation of Chinese Office Action dated Jul. 31, 2015 from corresponding Chinese Patent Application No. 201380022196.8, 7 pages.
English translation of Japanese Office Action dated May 20, 2016 from corresponding Japanese Patent Application No. 2015-500906, 4 pages.

* cited by examiner

COUPLING FOR CONNECTING FLUID-CONDUCTING LINES

BACKGROUND OF THE DISCLOSURE

1. Field of the Disclosure

The invention relates, in general, to couplings for the connection of lines, such as, in particular, flexible lines, to one another or for the coupling of flexible lines to fittings. In particular, the invention relates to self-sealing couplings or dry disconnect couplings, that is, couplings whose coupling parts seal the lines when the coupling is disconnected.

2. Description of the Related Art

Known from DE 299 11 281 U1 is a quick-action coupling for connecting or joining flexible lines, which comprises an inserting part and a receiving part. The parts can be locked together in a releasable and fluid-tight manner. Arranged in the two parts of the quick-action coupling in the flow channel is a spring-loaded valve with closing elements, the closing elements being loaded with compression springs. These closing elements in the form of balls, for example, remain open in the state in which the inserting part and receiving part are coupled together. When these coupling parts are disconnected, the closing elements are then pressed into their valve seat by the compression springs and, in this way, seal off the line connected with the respective coupling part.

In general, even in the case of self-sealing couplings, there is the problem that, when the coupling parts are disconnected, contents can leak from the lines. Although the valves in the coupling parts prevent the lines from remaining permanently open after disconnection has occurred, of course, leakage of line contents can always still occur during the closing operation of the valves when they are disconnected.

Especially in the case of cryogenic fluids, freezing of the line contents or of air moisture on the valves can also occur when they are disconnected. As a result of this, the valves may no longer close tightly and leakage of the line contents is no longer stopped. This is particularly critical also in relation to the danger of fire when combustible media are being conducted.

SUMMARY OF THE DISCLOSURE

The invention is therefore based on the object of improving quick-action couplings, such as those known in the prior art, in terms of their leakage when the coupling is disconnected, in particular when cryogenic fluids are being conducted. At the same time, the coupling should also have a high fire resistance, even in the disconnected state, for lines conducting combustible media or media that form explosive mixtures.

This object is achieved by the subject of claim 1. Advantageous embodiments and enhancements of the invention are presented in the dependent claims.

In accordance therewith, the invention provides a quick-action coupling for coupling together fluid-conducting lines, which comprises
 a first coupling part and
 a second coupling part, as well as
a seal for sealing the two coupling parts in the state in which they are coupled together. The quick-action coupling has a locking mechanism in order to couple together the two coupling parts in a releasable manner, wherein
 the first coupling part has a first valve arrangement and the second coupling part has a second valve arrangement. Each of the two valve arrangements comprises an axially displaceable valve and a corresponding valve seat, so that, in the state in which the valve and the valve seat are brought together, the respective fluid channel of the coupling part is sealed in a fluid-tight manner. The valve is designed especially preferably as a valve disk. The valves of the assembled coupling, that is, in the state in which the coupling parts are coupled together, are arranged lying opposite one another in the axial direction, with the valve of the first valve arrangement having an opening, in which a plunger is mounted so as to move axially, so that the plunger can move from a first position to a second position. In the second position, the plunger protrudes further outward from the valve of the first valve arrangement than it does in the first position, so that, in the state in which the coupling parts are coupled together, the plunger keeps the two valves apart from each other and, as a result, the fluid channels of the coupling parts are connected to each other. The plunger can be locked in the second axial position with respect to the valve by means of a catch device in order to keep the valve arrangement open. The locking mechanism is operatively connected with the catch device, so that, when the locking mechanism is actuated for decoupling the two coupling parts that are coupled to each other, the catch of the plunger is released before the coupling parts have been disconnected and the two valves are brought together with the respective valve seat and thereby seal the fluid channels of the coupling parts.

As a result of the mechanism for which, by release of the catch, the valves are initially brought into their valve seats, before the coupling parts are disconnected, fluid is still prevented from leaking from the valve arrangements when the coupling parts are disconnected.

In order to achieve also a high fire resistance or fire safety of the valves, the valves have first conical sealing surfaces and the valve seats have second conical sealing surfaces, with the opening angle of the first sealing surfaces being smaller than the opening angle of the second sealing surfaces. The high contact pressure on the annular sealing surfaces afforded by the different cones results in sealing of the valve arrangements, which functions securely both under exposure to high temperatures, such as those occurring during a fire, and also in the case of cryogenic media with correspondingly low temperatures of the valve arrangements. The tightness of the seal, particularly for cryogenic media, can be improved further by means of sealing elements that are elastic at low temperature. Accordingly, in an enhancement of the invention, it is provided that at least one of the sealing surfaces of a valve and of the corresponding valve seat has a plastic sealing element that is flexible at low temperature, such as, for instance, a sealing ring or gasket that is flexible at low temperature. Polytetrafluoroethylene or fluoroelastomers, for example, are suitable as a material for the gasket.

The quick-action coupling according to the invention can also be employed, in particular, as an emergency release coupling, for instance when the line that is being coupled with the coupling is subjected to an unanticipated tensile load. For this purpose, the locking mechanism comprises a release mechanism, which, at a predetermined tensile stress on a traction device joined to the release mechanism, actuates the locking mechanism and disconnects the coupling parts.

BRIEF DESCRIPTION OF THE FIGURES

The invention will be described below in detail on the basis of the appended figures. Identical reference numbers in the figures refer to identical or corresponding elements. Shown are.

DETAILED DESCRIPTION OF THE DISCLOSURE

Figure 1:
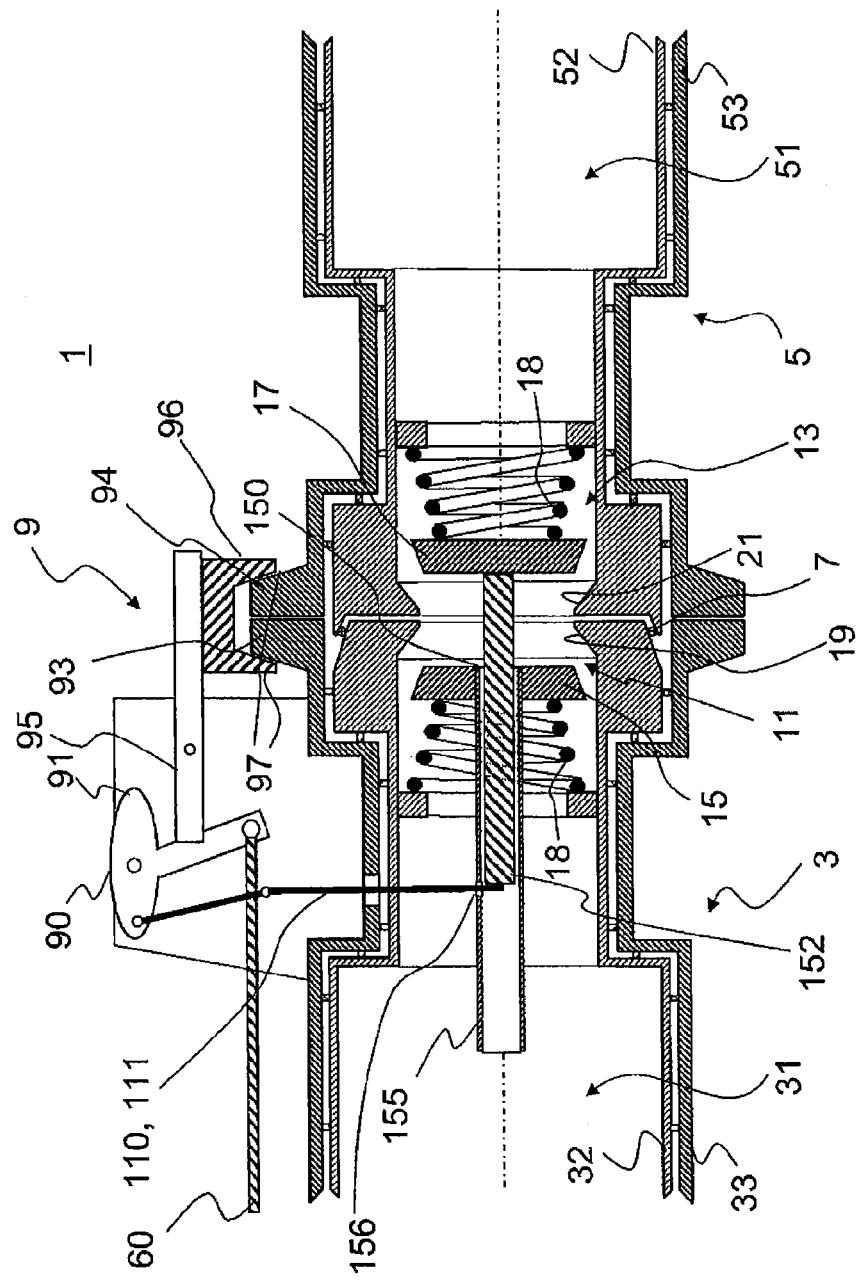
FIG. 1, a schematic cross section through parts of a quick-action coupling according to the invention in its operating position with opened valve arrangements.

FIG. 1 shows the quick-action coupling 1 in cross section in its operating position, that is, in the state in which the first coupling part 3 is coupled together with the second coupling part 5.

The two coupling parts 3, 5 are joined by way of a seal 7 in a tightly sealed manner. The coupling parts 3, 5 are coupled to each other in a releasable manner, in this case by means of a schematically illustrated locking mechanism 9. The locking mechanism presses the two coupling parts 3, 5 together in the axial direction, so that a contact pressure that is sufficient for sealing is exerted on the seal 7 between the coupling parts 3, 5. When cryogenic fluids are conducted through the line, preferably a material such as polytetrafluoroethylene (PTFE) and/or a fluoroelastomer, which is flexible at low temperature, is used for the seal 7.

Each of the two coupling parts 3, 5 has a valve arrangement 11 or 13, respectively, in order to seal the fluid channels of the coupling parts 3, 5. Both the first valve arrangement 11 in the first coupling part and the second valve arrangement 13 of the second coupling part 5 are designed as disk valves in this case. The disk valves each comprise a valve 15, 17 in the form of a valve disk and a valve seat 19, 21. The valve arrangements can also have valves different from those designed in the form of a valve disk; for example, they can have valves designed in the form of a piston or a ball. The disk form is advantageous, because it requires little space in the axial direction and the two surfaces of the valve that face each other displace completely or nearly completely any fluid lying in between when the valve arrangement is closed.

The valves 15, 17 are mounted so as to move axially and seal the respective fluid channel 31, 51 of the coupling parts 3, 5 in a fluid-tight manner when the valves 15, 17 are brought together with the corresponding valve seats 19, 21. In the position of the coupling parts 3, 5 shown in FIG. 1, in which they are coupled to each other, the two valves 15, 17 are arranged laying opposite one another in the axial direction.

Without any limitation to the special exemplary embodiment shown schematically in FIG. 1, the two valves 15, 17 are each coupled to a spring 18 according to a preferred enhancement of the invention; that is, they are spring-loaded, with the spring exerting a force on the valves 15, 17 axially in the direction onto the valve seat 19, 21. By means of this exerted spring force, the valve arrangements 11, 13 are closed when the coupling parts 3, 5 are disconnected.

The valve 15 of the first valve arrangement 11 has an opening 150, in which a plunger 152 is mounted so as to move axially. Specially provided for this purpose in the embodiment of the invention illustrated in FIG. 1 is a tube 155 fastened to the first valve 15 and extending in the axial direction, which serves as a guide element for the plunger 152. The plunger 152 can slide in this tube 155 along its longitudinal direction.

The axially movable mounting of the plunger 152 enables it to be moved from a first position to a second position, with the plunger 152 protruding further from the valve 15 of the first valve arrangement 11 in the second position than in the first position. Preferably, the plunger 152 does not protrude at all in the first position. Accordingly, the end of the plunger either is flush with the valve 15 or else it is retracted with respect to the opening 150.

In the operating position shown in FIG. 1, the plunger 152 is situated in the second position and thus protrudes out of the valve 15.

The first coupling part 3 further has a catch device 110. By means of this catch device 110, the plunger 152 is locked in the second axial position shown in FIG. 1 with respect to the valve 15. This catch device is preferably designed as a catch pin 111. The catch pin is inserted in a radial direction into the tube 155 through an opening 156 introduced into the sleeve of the tube 155 so as to lock the plunger 152 in the operating position. Because the plunger 152 catches in the second axial position, it keeps the two valves 15, 17 apart from each other in the operating position, opposing the spring force exerted by the springs 18 and acting on the valves 15, 17, so that the valve arrangements 11, 13 are kept in an opened state and thus the two fluid channels 31, 51 are connected to each other.

As can further be seen in FIG. 1, the locking mechanism 9 and the catch device 110 are operatively connected. The special design according to FIG. 1 is to be regarded as merely exemplary in this case. In the example shown, the locking mechanism has a rotating element 90 with a cam 91. When the rotating element rotates, the cam actuates a lever 95, to which a clamping element 96 is attached. Said clamping element grasps two collars 93, 94 of the two coupling parts 3, 5 and clamps the two coupling parts 3, 5 together in the axial direction at the collars 93, 94 and/or the clamping element 96 through oblique guide surfaces 97 by contact pressure in the radial direction. Even though the design with a clamping element and collars represents an especially preferred arrangement for clamping together the coupling parts 3, 5, the elements of the locking mechanism, as illustrated in the figures, serve merely for illustration of the basic course of movement when decoupling occurs. Thus, a differently designed locking mechanism may also be used. As an example and an advantageous enhancement of the invention, mention is made at this point of a movement of the clamping element and the catch device along corresponding control curves. Such a mechanism is described in DE 10 2005 006 088 A1, the content of which is also fully incorporated for the subject of the present application in regard to the movement of the clamping element and an emergency release.

Figure 2:
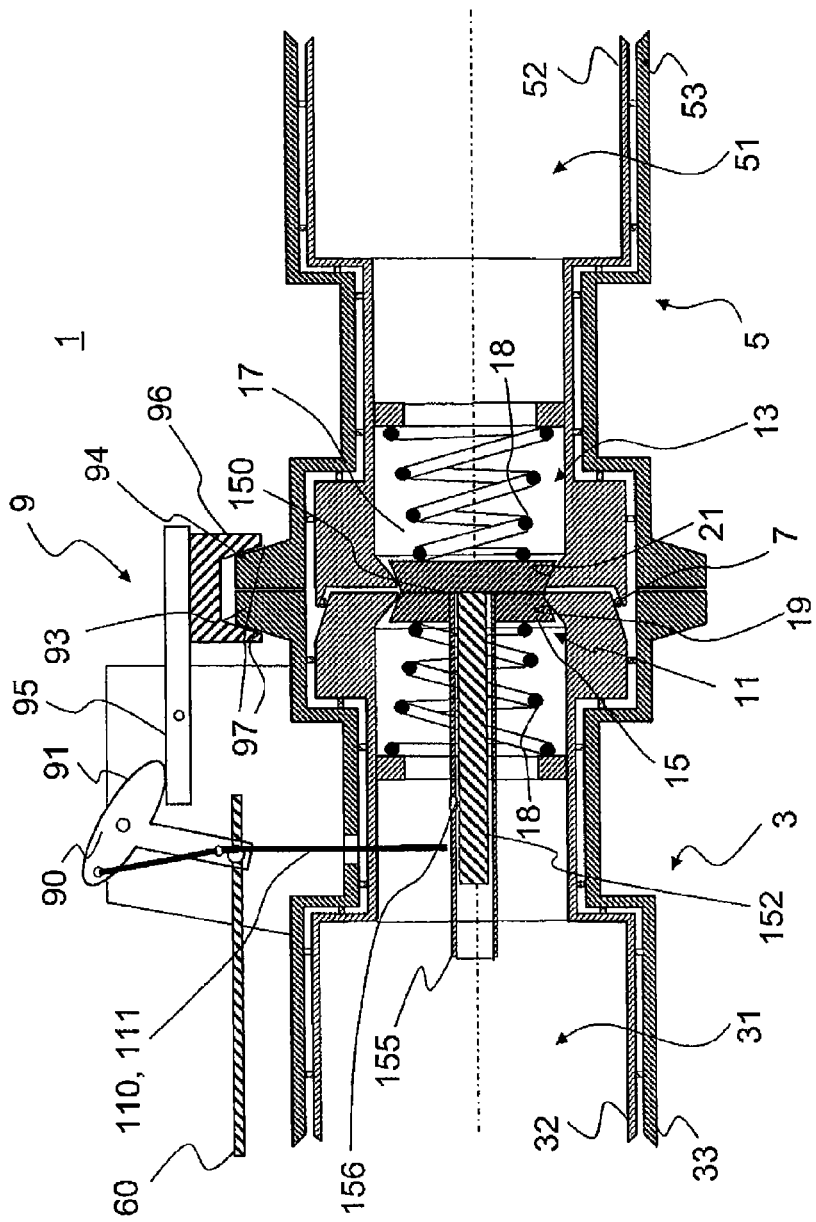
FIG. 2, the quick-action coupling during decoupling but still prior to disconnection of the coupling parts of the coupling.

As can be seen on the basis of FIG. 1, when the locking mechanism 9 is actuated for decoupling the two coupling parts 3, 5 that are coupled to each other, the catch of the plunger 152 is released here by rotating the rotating element 90, even before the coupling parts are disconnected, in that the catch pin 111 that is operatively connected with the rotating element 90 is moved radially outward and thereby pulled out of the opening 156 of the tube 155. On account of the forces exerted by the springs 18, the valves 15, 17 are then brought together with the respective valve seats 19, 21 and the fluid channels 31, 51 of the coupling parts 3, 5 are thereby sealed. FIG. 2 shows this state during decoupling.

As can be seen, no volume in which the fluid conducted by the line can still be present remains any longer between the valves 15, 17. At least the remaining volume is very small.

Figure 3:
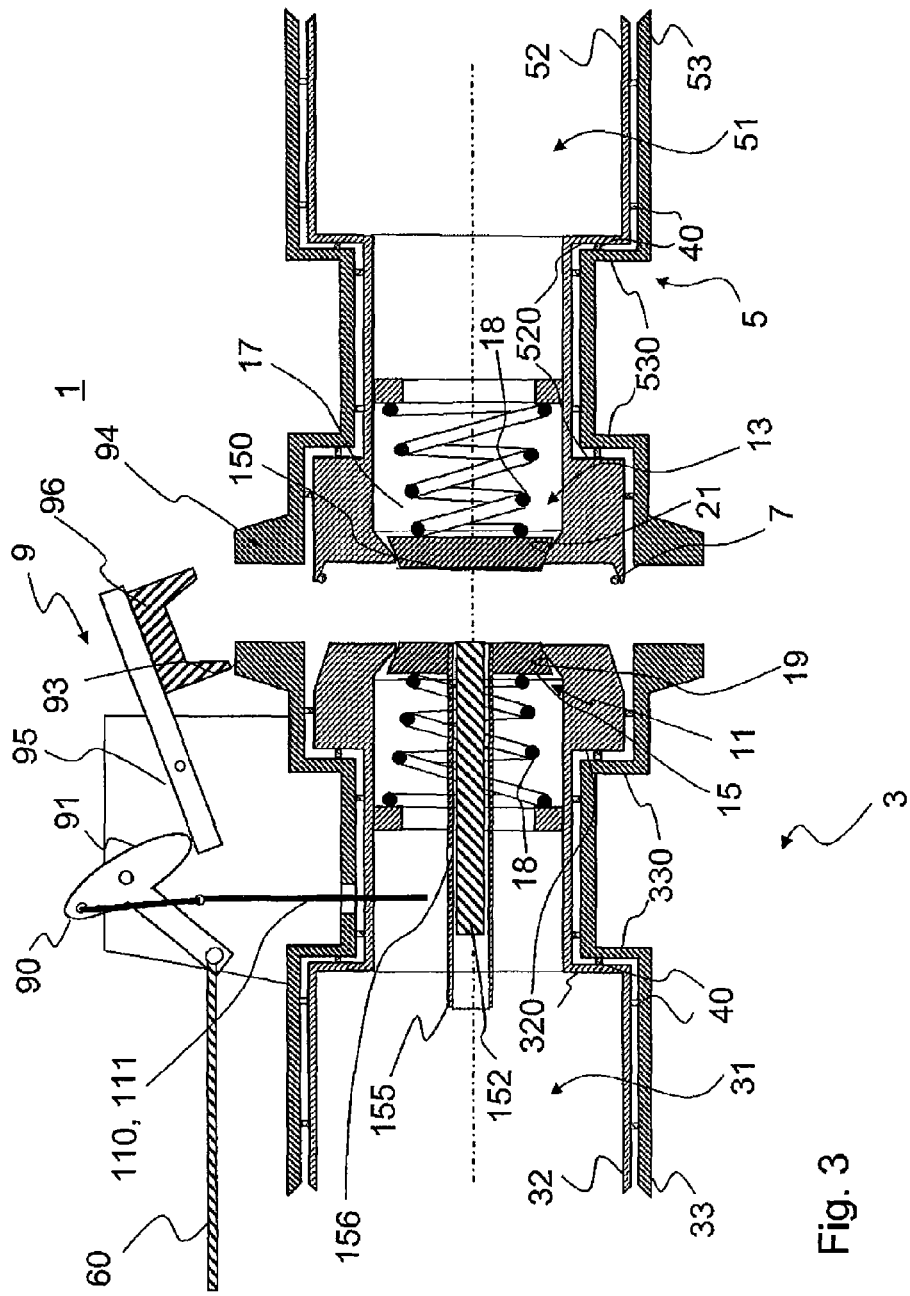
FIG. 3, the coupling parts of the quick-action coupling after decoupling.

The fluid is displaced from the region between the valves 15, 17 when the two valves are brought together. In an advantageous manner, the effect of this is that hardly any fluid or even none at all can leak out when the coupling parts are disconnected. The final disconnection of the two coupling parts occurs through release of the clamping jaws 96. For this purpose, in the example shown in FIGS. 1 and 2, the lever 95 is actuated by the locking mechanism, so that the clamping jaws 96 are moved radially outward. FIG. 3 shows the two coupling parts 3, 5 after decoupling has occurred.

Because any leakage of the fluid conducted in the line is completely or at least nearly completely prevented, the quick-action coupling according to the invention is suitable, in particular, for lines conducting hazardous substances of any kind. Such hazardous substances may comprise substances exhibiting fire, explosion, or also environmental risks. The quick-action coupling is especially suitable also for lines conducting cryogenic media and particularly cryogenic media with risk of fire and explosion. In this case, particularly cold liquefied combustible gases come into consideration. Special importance is given in this case to cold liquefied natural gas or methane. When the coupling parts 3, 5 are disconnected, especially also in conjunction with the preferred embodiment of the seal of the disk valves 11, 13 described further below, the mechanism according to the invention prevents any freezing of the medium itself or of any atmospheric moisture present in the region of the seals when disconnection occurs. Any freezing of the medium in the region of the sealing surfaces can lead to the occurrence of permanent leakage in the valve arrangement.

Another characteristic of the quick-action coupling according to the invention is the possibility of rapid disconnection by simple actuation of the locking mechanism. As a result of this, the quick-action coupling 1 according to the invention may be employed, in particular, also as an emergency release coupling. For this purpose, in an enhancement of the invention, the locking mechanism 9 comprises a release mechanism, which, at a predetermined tensile stress on a traction device joined to the release mechanism, actuates the locking mechanism 9 and disconnects the coupling parts 3, 5. In the example illustrated, a traction cable 60 is provided as the traction device. If tensile stress is exerted on the traction device or traction cable, the rotating element 90 rotates in the example illustrated, as a result of which there occurs both an unlocking of the plunger 152 and also an unlocking of the locking mechanism by radial outward movement of the clamping jaws 96. The traction cable can then be positioned parallel to a flexible line connected to a coupling part, with its length being chosen to be shorter than the length of the line. If, unexpectedly, the flexible line becomes taut, the traction cable is initially subjected to tensile stress before the flexible line and disconnects the coupling parts 3, 5 even before a critical tensile load can act on the flexible line. The release mechanism shown in FIG. 1 is specially designed such that the traction cable is fastened to the first coupling part 3. Accordingly, in this case, the flexible line being secured is connected to this coupling part 3.

In addition to the catching of the plunger 152, said plunger can be operatively connected with the locking mechanism 9 in such a manner that, when the coupling parts 3, 5 are coupled together, initially the two coupling parts 3, 5 are connected in a tightly sealed manner and, after they have been tightly connected, the plunger 152 is moved in the axial direction by means of the locking mechanism, so that the two valves 15, 17 are forced apart and, as a result, the fluid channels 31, 51 of the coupling parts 3, 5 open and connect to each other. This also enables a connection of the coupling parts 3, 5 without any leakage of fluid being able to occur during the coupling operation.

For lines conducting cryogenic fluid, it is further advantageous when, as in the case of the exemplary embodiment shown in FIGS. 1 to 3, the coupling parts 3, 5 have a double-wall design. For this purpose, the coupling parts 3, 5 have inner wall elements 32, 52 as well as surrounding outer wall elements 33, 53 that are distanced from the inner wall elements 32, 52. Preferably, the seal 7 is arranged in such a way that, in the state in which the coupling parts 3, 5 are coupled together, the two inner wall elements 32, 52 are connected in a tightly sealed manner. This is advantageous so as also to achieve good thermal insulation at the coupling site.

However, it is also conceivable, for example, to have a connection such as, for instance, a welding of the inner and outer wall elements in the region in which the seal 7 seals off the two coupling parts 3, 5 from the surroundings.

According to an especially advantageous enhancement of the invention, the coupling 1 is designed in this case, as also illustrated in the figures, such that, even in the state in which they are coupled together, the coupling parts 3, 5 form a double-wall arrangement over the two coupling parts 3, 5, including the coupling site. As a result, heat losses at the coupling site are minimized.

However, in a double-wall design of the quick-action coupling 1, there is the problem of achieving sufficient mechanical stability. In particular, substantial forces may occur in the axial direction owing to the locking, and these forces need to be transmitted from the outer part of the wall onto the inner part of the wall with the sealing elements in order to achieve a secure seal. In order to stabilize the coupling parts 3, 5 mechanically and to impart forces with components in the axial direction between the inner and outer wall elements 32, 52, 33, 53, it is provided in an enhancement of the invention that the inner wall element 32, 52 and the outer wall element 33, 53 of a coupling part 3, 5 have interlocking wall segments 320, 520, 330, 530 in the axial direction, which prevent any axial shift of the outer wall element 33, 53 with respect to the inner wall element 32, 52. The interlocking wall segments 320, 330 of the first coupling part 3 and the likewise interlocking wall segments 520, 530 of the second coupling part 5 are indicated in FIG. 3.

In order to maintain the distance between the wall elements, suitable spacers 40, arranged between the inner and outer wall elements, are used between the outer and inner wall elements 32, 33 and 52, 53, respectively.

Figure 4:
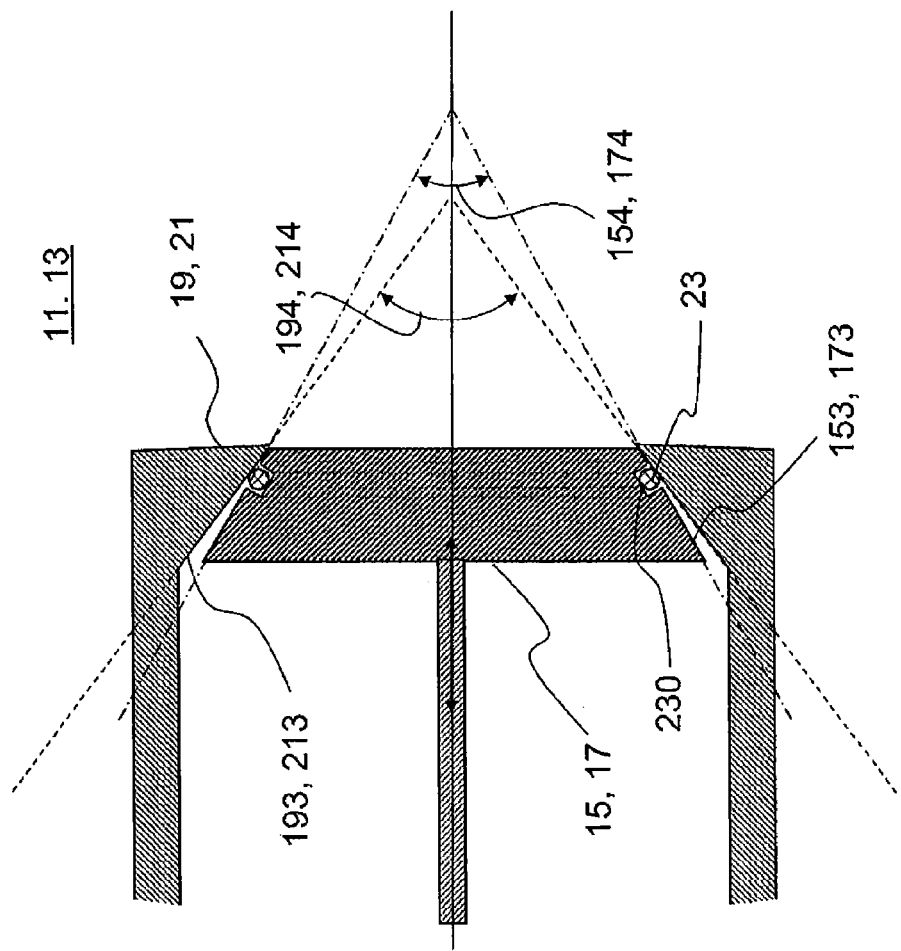
FIG. 4, details of one of the valve arrangements of the quick-action coupling in the form of a disk valve.

FIG. 4 shows details of the valve arrangements 11, 13, designed as disk valves. For purposes of clarity, some parts, such as, for example, the opening 150 in the valve 15 and the springs 18, are not illustrated here. The valve 15 of the first valve arrangement 11 and/or the valve 17 of the second valve arrangement 13 have conically tapering first sealing surfaces 153 and 173, respectively. The valve seats 19, 21, also have second conical sealing surfaces 193 and 213, respectively. As can be seen on the basis of FIG. 4, the opening angle 154 and 174 of the first sealing surface 153 and 173, respectively, is smaller than the opening angle 194, 214 of the corresponding second sealing surface 193, 213 of the respective valve seat 19 and 21.

A further feature of the valve arrangements 11, 13 is that, in each case, at least one of the conical sealing surfaces 153, 173 of a valve 15, 17 and/or of the corresponding valve seat 19, 21 has a plastic sealing element that is flexible at low temperature. For this purpose, in the special example illustrated in FIG. 4, a gasket 23 that is flexible at low temperature is used. Furthermore, in this example, the gasket 23 is arranged on the valve 15 and 17, respectively, in each case. In order to fix in place the gasket 23 on the sealing surface 153 and 173, an annular peripheral groove 230, in which the gasket 23 is seated, is introduced into the sealing surface 153, 173.

The gasket 23, which is flexible at low temperature, brings about secure sealing even at low temperatures. The different cones 154, 174 and 194, 214 of the corresponding sealing surfaces 153, 193 and 173, 213, respectively, further bring about sealing along a narrow, line-shaped ring on the sealing surfaces. Correspondingly high contact forces act on this narrow ring. Even if there is icing on the sealing surfaces during closure, this can be eliminated by the high contact pressure. In addition, the sealing via the different cones ensures that, even in the case of a fire and correspondingly very high temperatures at the parts of the valve arrangements 11, 13, the seal does not fail, even in the event that the gasket 23 is damaged or even destroyed.

Figure 5:
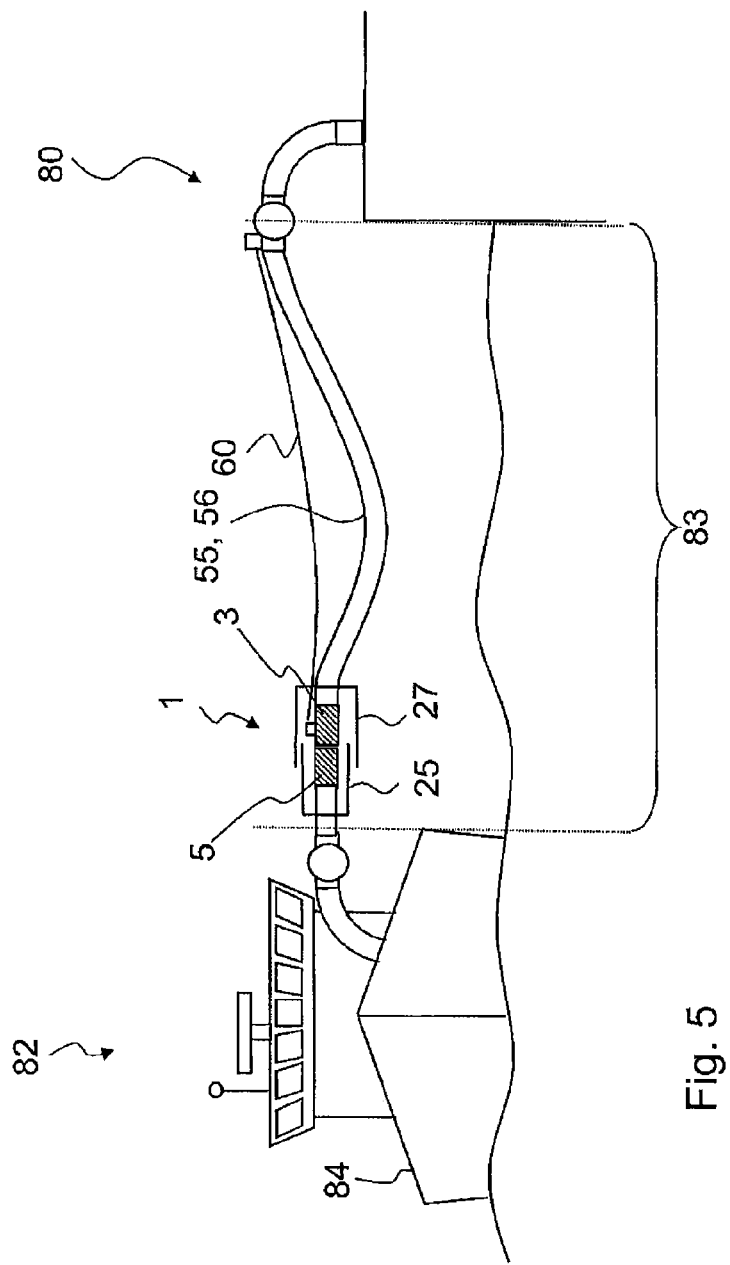
FIG. 5, an application of a quick-action coupling 1 according to the invention.

Illustrated in FIG. 5 is an application of a quick-action coupling 1 according to the invention. Shown in FIG. 5, in particular, is an arrangement for conveying a fluid between a loading and unloading device 80 and a vehicle 82. In the exemplary embodiment of FIG. 5, the vehicle 82 is a ship 84. The application of the coupling according to the invention in the maritime field or, in particular, in the transfer of liquids and gases to a ship is especially advantageous as well, because, on the one hand, emissions, and, on the other hand, any contamination of the conveyed fluid by sea water is prevented. However, the arrangement can also be used in the same way for loading and/or unloading train cars, truck trailers, and airplanes, for example. In the example illustrated, the loading or unloading device 80 is arranged on land. However, it is equally possible to carry out a loading or unloading from ship to ship, from drill platform to ship, or from ship to a buoy with use of an arrangement according to the invention.

In order to convey a fluid, such as, for example, cold liquefied natural gas, from the loading or unloading device 80 to the vehicle 82 or vice versa, a line 55 with a quick-action coupling 1 is installed between the loading or unloading device 80 and the vehicle 82, with the line 55 comprising a flexible line 56, to which one of the coupling parts 3, 5 is attached. In the example shown in FIG. 5, the first coupling part 3 is attached to the flexible line 56.

As can further be seen on the basis of FIG. 5, the quick-action coupling 1 is arranged in the intervening space 83 between the loading or unloading device 80 and the vehicle 82. One end of a traction device is installed at the locking mechanism 9 and the other end at the vehicle or on the side of the loading or unloading device 80, so that the traction device runs along the flexible line 56. In the example shown in FIG. 5, a cable or traction cable 56 is provided as traction device. It is equally possible to use a wire or a chain. Furthermore, in this case, one end of the traction device is fastened to the loading or unloading device 80. The opposite alternative involving fastening at the vehicle 82 is equally possible. In this case, the quick-action coupling is preferably arranged closer to the loading or unloading device 80.

As can further be seen on the basis of FIG. 5, the length of the traction device is designed such that, when the vehicle 82 withdraws from the loading or unloading device 80, a pull is imparted to the traction device before the flexible line 56 becomes taut owing to the withdrawal of the vehicle 82. As a result of this, the locking mechanism 9 is actuated by the traction device before the flexible line 56 comes under stress. This arrangement offers special technical advantages in terms of safety. During the loading or unloading of ships, a coupling was often arranged inside of the ship's side in the region of the deck. In itself, this is advantageous, because, when the coupling is disconnected, any leakage of fluid is limited to the region of the deck and thus hazardous substances do not enter the environment. However, if there is an emergency disconnection, in this case, there is a substantial danger for the persons working on the deck owing to the disconnecting flexible line with the typically very heavy coupling part coupled to it.

If, by contrast, a quick-action coupling according to the invention, with an arrangement such as that illustrated in FIG. 5 by way of example, is used, then the flexible line 56 with its heavy coupling part 3 falls into the intervening space 83 between the vehicle and the loading or unloading device 80; in the case of a ship 84, this means the water lying in between. In this case, there is no longer any danger to personnel. At the same time, the special decoupling mechanism also prevents any leakage of the conveyed fluid into the environment, even though the coupling is disconnected above the water surface and, in consequence thereof, the flexible line can fall into the water.

This arrangement additionally offers the advantage of a lesser fire hazard when combustible or explosive fluids are conveyed, because fire-igniting sources are typically present at or on the vehicle 82 or the loading or unloading station 80.

Additionally illustrated in FIG. 5 is also an enhancement of the invention. As can be seen on the basis of the schematic drawing, the sheaths or casings 25, 27 surrounding the coupling parts 3, 5 are attached to the coupling parts 3, 5 and, when the coupling parts 3, 5 are in the state in which they are coupled together, overlap in the axial direction. These sheaths 25, 27 prevent rain or splashed water from being able to enter the coupling parts 3, 5 and the locking mechanism 9. Especially in the case when cryogenic fluids are conveyed, icing might otherwise occur under detrimental conditions. The ice could, in turn, obstruct the locking mechanism or coat the coupling parts 3, 5 with a layer of ice in such a way that the decoupling of the coupling parts 3, 5 becomes difficult.

LIST OF REFERENCE NUMBERS 1 quick-action coupling
3 first coupling part
5 second coupling part
7 seal
9 locking mechanism
11 first valve arrangement
13 second valve arrangement
15, 17 valve
18 spring
19, 21 valve seat
23 gasket that is flexible at low temperature
25, 27 sheath
31, 51 fluid channel
32, 52 inner wall elements
33, 53 outer wall elements
40 spacer
55 line
56 flexible line
60 traction cable
80 loading or unloading device
82 vehicle
83 intervening space between 80, 82
84 ship
90 rotating element
91 cam
93, 94 collar
96 clamping element
97 guide surface 110 catch device
111 catch pin
150 opening in 15
152 plunger
153, 173 first sealing surfaces
154, 174 opening angle of 153, 173
155 tube
156 opening in 155
193, 213 second sealing surfaces
194, 214 opening angle of 193, 213
230 groove

The invention claimed is:

1. A quick-action coupling for coupling together fluid-conducting lines, comprising:
   a first coupling part, said first coupling part comprising a first fluid channel;
   a second coupling part, said second coupling part comprising a second fluid channel, as well as a seal for sealing the two coupling parts in the state in which they are coupled together; and
   a locking mechanism in order to couple together the two coupling parts in a releasable manner, wherein
   the first coupling part has a first valve arrangement and the second coupling part has a second valve arrangement, and wherein each of the two valve arrangements has an axially displaceable valve and a corresponding valve seat, so that, in the state in which the valve and the valve seat are brought together, the first and second fluid channels of first and second coupling parts are sealed in a fluid-tight manner, and wherein each of the two valves are arranged lying opposite one another in the axial direction, wherein the valve of the first valve arrangement has an opening, in which a plunger is mounted so as to move axially, so that the plunger can move from a first position to a second position, wherein, in the second position, the plunger protrudes from the valve of the first valve arrangement further outward as compared to the first position, so that, in the state in which the coupling parts are coupled together, the plunger keeps each of the two valves apart from each other and, as a result, the first and second fluid channels of the first and second coupling parts are connected to each other,
   and wherein the plunger can be locked in the second axial position with respect to the valve by means of a catch device and wherein the locking mechanism is operatively connected to the catch device, so that, when the locking mechanism is actuated for decoupling the two coupling parts that are coupled to each other, before disconnection of the coupling parts, a catch of the plunger is released and each of the two valves are brought together with the respective valve seat and seal the first and second fluid channels of the first and second coupling parts.

2. The quick-action coupling according to claim 1, further characterized in that each of the two valves have first conical sealing surfaces and the valve seats have second conical sealing surfaces, wherein the opening angle of the first sealing surfaces is smaller than the opening angle of the second sealing surfaces.

3. The quick-action coupling according to claim 1, further characterized in that each of the two valves have first conical sealing surfaces and the valve seats have second conical sealing surfaces, wherein, in each case, at least one of the sealing surfaces of one of the two valves and of the corresponding valve seat has a plastic sealing element that is flexible at low temperature for conducting cryogenic fluids.

4. The quick-action coupling according to claim 1, further characterized in that the locking mechanism comprises a release mechanism, which, at a predetermined tensile stress on a traction device joined to the release mechanism, actuates the locking mechanism and disconnects the coupling parts.

5. The quick-action coupling according to claim 1, further characterized in that sheaths surrounding the coupling parts are attached to the coupling parts and, in the state in which the coupling parts are coupled together, overlap in the axial direction.

6. The quick-action coupling according to claim 1, further characterized in that coupling parts have a double-wall with inner wall elements and surrounding outer wall elements at a distance from the inner wall elements, wherein, in the state in which the coupling parts are coupled together, a seal connects the two inner wall elements of the coupling parts in a tightly sealed manner.

7. The quick-action coupling according to claim 6, further characterized in that the inner wall element and the outer wall element of a coupling part have interlocking wall segments in a radial direction, which prevent any axial shift of the outer wall element with respect to the inner wall element.

8. The quick-action coupling according to claim 1, further characterized in that the plunger is operatively connected with the locking mechanism in such a manner that, when the coupling parts are coupled together, initially the two coupling parts are connected in a tightly sealed manner and, after their tight connection, the plunger is moved in an axial direction by means of the locking mechanism, so that the two valves are forced apart and, as a result, the fluid channels of the coupling parts open and connect to each other.

9. The quick-action coupling according to claim 1, further characterized in that the valves are each coupled to a spring, wherein the spring exerts a force on the valves axially in a direction onto the valve seat in order to close the valve arrangements when the coupling parts are disconnected.

10. An arrangement for conveying a fluid between a loading or unloading device and a vehicle, wherein, between the loading or unloading device and the vehicle, a line with a quick-action coupling according to claim 1 is installed, wherein the line comprises a flexible line, to which one of the coupling parts is attached, and wherein the coupling is arranged in the intervening space between the loading or unloading device and the vehicle, and wherein one end of a traction device is attached to the locking mechanism and the other end is attached to the vehicle or onto the side of the loading or unloading device and its length is chosen such that, when the vehicle withdraws from the loading or unloading device, a pull is imparted to the traction device and the locking mechanism is actuated before the flexible line becomes taut owing to the withdrawal of the vehicle.

11. A method of coupling of lines conducting cold liquefied methane, with the quick-action coupling of claim 1.

* * * * *